United States Patent
Schaake

(10) Patent No.: US 10,486,501 B2
(45) Date of Patent: Nov. 26, 2019

(54) FLAP ARRANGEMENT

(71) Applicant: Mahle International GmbH, Stuttgart (DE)

(72) Inventor: Norman Schaake, Markgroeningen (DE)

(73) Assignee: Mahle International GmbH (DE)

( * ) Notice: Subject to any disclaimer, the term of this patent is extended or adjusted under 35 U.S.C. 154(b) by 59 days.

(21) Appl. No.: 15/068,288

(22) Filed: Mar. 11, 2016

(65) Prior Publication Data

US 2016/0263967 A1    Sep. 15, 2016

(30) Foreign Application Priority Data

Mar. 12, 2015 (DE) .................. 10 2015 204 511

(51) Int. Cl.
| | |
|---|---|
| *B60H 1/34* | (2006.01) |
| *B60H 1/00* | (2006.01) |
| *F16K 1/226* | (2006.01) |

(52) U.S. Cl.
CPC ....... *B60H 1/3421* (2013.01); *B60H 1/00678* (2013.01); *F16K 1/2261* (2013.01); *B60H 2001/006* (2013.01); *B60H 2001/00714* (2013.01)

(58) Field of Classification Search
CPC .............. B60H 1/3421; B60H 1/00678; B60H 1/3241; F16K 1/2261
USPC ....................................................... 454/155
See application file for complete search history.

(56) References Cited

U.S. PATENT DOCUMENTS

| | | | | |
|---|---|---|---|---|
| 5,499,947 | A | * | 3/1996 | Tauber ............... B60H 1/00678 137/15.08 |
| 5,669,350 | A | | 9/1997 | Altmann et al. |
| 6,116,541 | A | * | 9/2000 | Chuang .................. B64D 13/04 244/1 N |
| 2003/0054751 | A1 | * | 3/2003 | Parekh ............... B60H 1/00678 454/121 |
| 2004/0231834 | A1 | | 11/2004 | Shibata et al. |

(Continued)

FOREIGN PATENT DOCUMENTS

| | | |
|---|---|---|
| DE | 8911657.7 U1 | 9/1989 |
| DE | 4329527 A1 | 3/1995 |

(Continued)

OTHER PUBLICATIONS

DE19717335A1 English Translation.*

(Continued)

*Primary Examiner* — Steven B McAllister
*Assistant Examiner* — Allen R Schult
(74) *Attorney, Agent, or Firm* — Fishman Stewart PLLC

(57) ABSTRACT

An exemplary flap arrangement may include a housing and a flap arranged in the housing for regulating an air flow in the housing. The flap may have a flap main body with a front side arranged on an air inflow side in an operating state. The flap arrangement may also include an elastic sealing lip with a sealing surface provided on the flap main body. The flap arrangement may further include a rib arranged in the region of the sealing lip and outside the sealing surface. The rib may project substantially vertically from the front side of the flap main body, and may serve for air flow rate reduction during opening of the flap. The sealing lip and the rib may be formed in one piece.

17 Claims, 1 Drawing Sheet

(56) References Cited

U.S. PATENT DOCUMENTS

| | | | | |
|---|---|---|---|---|
| 2005/0095970 | A1* | 5/2005 | Ito | B60H 1/00678 454/69 |
| 2010/0224253 | A1 | 9/2010 | Azar et al. | |
| 2011/0308640 | A1* | 12/2011 | Hasegawa | F02D 9/1015 137/455 |

FOREIGN PATENT DOCUMENTS

| | | | |
|---|---|---|---|
| DE | 19717335 | A1 | 11/1997 |
| DE | 10018268 | A1 | 10/2001 |
| DE | 102005008330 | A1 | 8/2006 |
| DE | 102007036824 | A1 | 2/2009 |
| DE | 102010063334 | A1 | 6/2012 |
| EP | 1783409 | A1 | 5/2007 |
| FR | 2669277 | A1 | 5/1992 |
| JP | 2004106764 | A | 4/2004 |
| JP | 2006315437 | A | 11/2006 |

OTHER PUBLICATIONS

DE10018268A1 English Translation.*
JP2006315437A(English Translation).*
European Search Report for EP 16157927.1 dated Dec. 9, 2016.
English Abstract of JP-2004106764-A.
English Abstract of JP-2006315437-A.
English Abstract of DE-102010063334-A1.
English abstract for DE102005008330A1.
English abstract for DE-19717335A1.
English abstract for DE-10018268A1.
English abstract for FR-2669277A1.
German Search Report for DE-102015204511.0, dated Feb. 18, 2016.
English abstract for DE-102007036824A1.

* cited by examiner

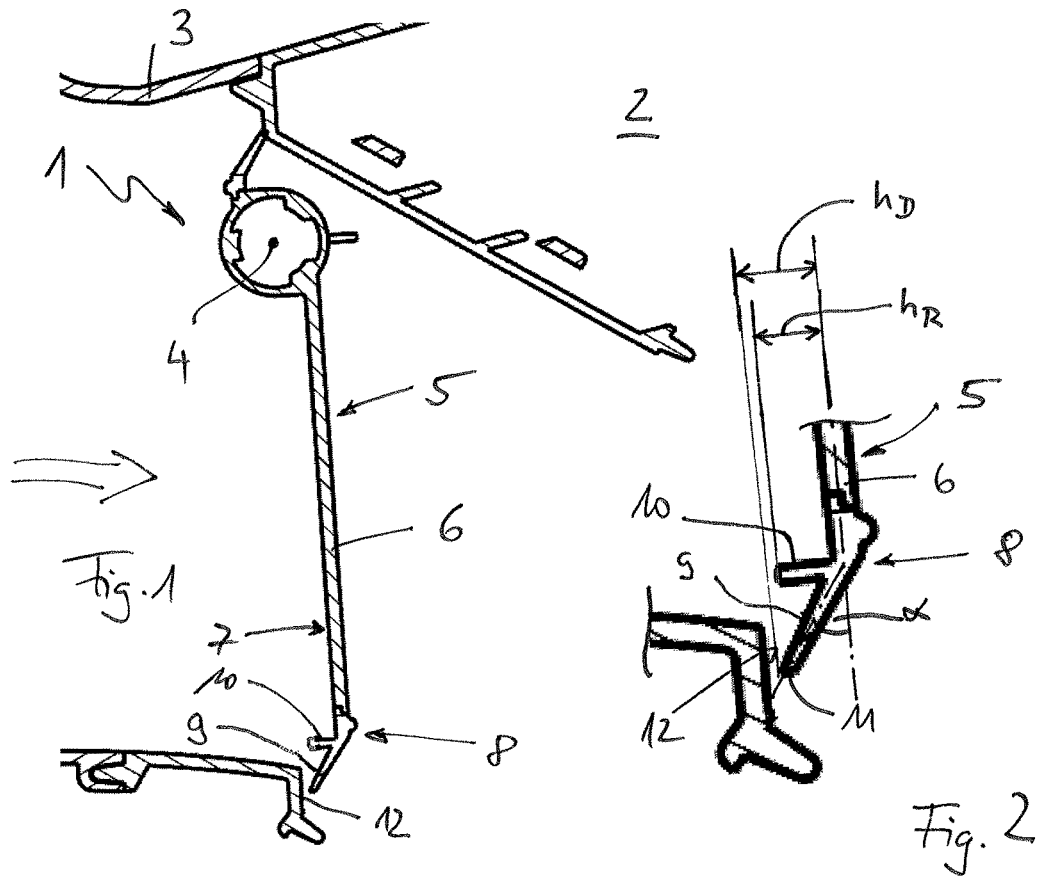
Fig. 1
Fig. 2
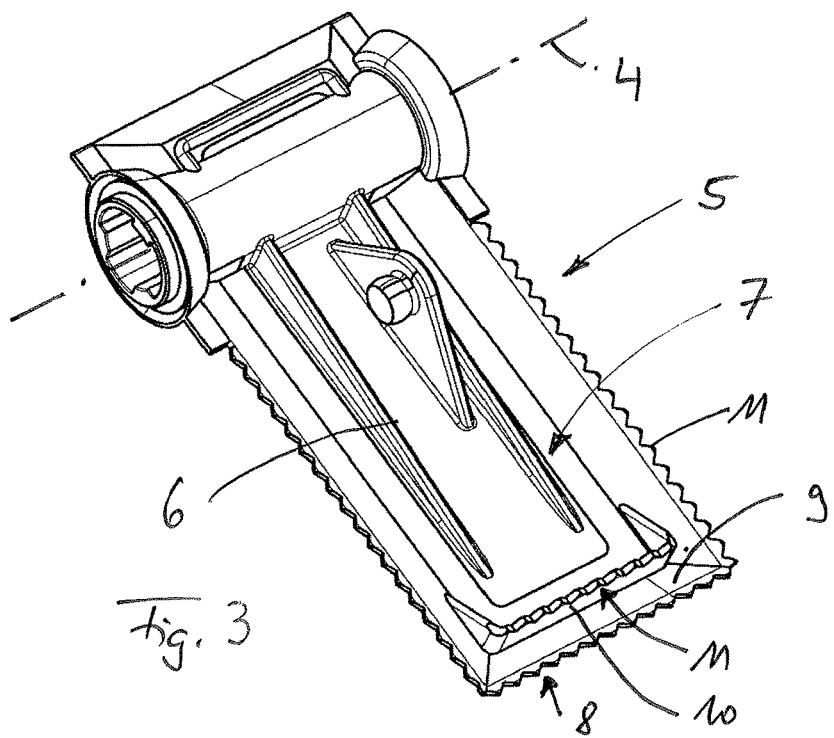
Fig. 3

FLAP ARRANGEMENT

CROSS-REFERENCE TO RELATED APPLICATIONS

This application claims priority to German Patent Application No. 10 2015 204 511.0, filed Mar. 12, 2015, the contents of which are hereby incorporated by reference in their entirety.

TECHNICAL FIELD

The present invention relates to a flap arrangement, in particular for a vehicle air conditioning system. The invention also relates to an air conditioning system having at least one such flap arrangement.

BACKGROUND

DE 10 2007 036 824 A1 has disclosed a generic flap arrangement having a housing and having a flap, which is arranged in the housing, for regulating an air flow in the housing, wherein the flap has a flap main body which has a front side, arranged on the air inflow side at least in an operating state, and a rear side, arranged on a side averted from the flow. Here, on the rear side of the flap main body, there is arranged an air-guiding element which extends at an oblique angle with respect to the rear side of the flap main body. In this way, it is sought in particular to be able to at least minimize an unpleasant whistling noise upon opening and closing of the flap.

A further flap arrangement having a flap is known from EP 1 783 409 A1.

In the use of flaps which are mounted in single-limb configuration, in particular in air conditioning systems of motor vehicles, it is initially the case during the opening of said flaps that a narrow gap is formed through which a high air flow rate is diverted in the manner of a funnel, so to speak. If a rectilinear obstruction, for example a groove of a fitted duct or an edge, is situated closely downstream of said gap and transversely with respect to the inflow direction, an unpleasant whistling noise can occur. Since such obstructions are however, in part, unavoidable, the escape of air from the gap must be impeded. This partial impedance must however again have no adverse effects in terms of acoustics or air flow rate when the flap is fully open. A disadvantage in the case of the flap arrangements known from the prior art is however that their capability for reducing the whistling noises is only inadequate, because they are situated too far away from the air gap itself during the opening of the flap.

SUMMARY

The present invention is therefore concerned with the problem of specifying, for a flap arrangement of the generic type, an improved or at least alternative embodiment which firstly further minimizes the generation of a whistling noise but secondly has no disruptive effect, either in terms of acoustics or in terms of air flow rate, when the flap is fully open.

Said problem is solved according to the invention by way of the subject matter of the independent claims. The dependent claims relate to advantageous embodiments.

The present invention is based on the general concept, on a flap main body in the region of an elastic sealing lip, arranging a rib which projects substantially perpendicularly from a front side of the flap main body and which, even when the flap is only slightly open, prevents an unpleasant whistling noise being generated owing to an air flow through the gap that then forms. The flap arrangement according to the invention, which may be arranged for example in a vehicle air conditioning system, has a housing and has a flap, which is arranged in said housing, for regulating an air flow in the housing. Said flap has said flap main body with a front side arranged on the air inflow side in an operating state. An elastic sealing lip with a sealing surface is now provided on the flap main body itself, wherein said sealing lip lies by way of its sealing surface against a flap stop, and thus imparts a sealing action, when the flap is closed.

According to the invention, in the region of the sealing lip but outside the sealing surface, there is now arranged the rib which projects substantially vertically from the front side of the flap main body and which serves for air flow rate reduction during the opening of the flap, wherein the sealing lip and the rib are formed in one piece. By means of the continuous rib which is provided according to the invention and which is additionally arranged on the sealing lip outside the sealing surface, it can be achieved that, in particular at small flap opening angles, the flow through the gap that then forms between sealing lip and flap stop on the housing is greatly restricted, and thus the undesired whistling noise is greatly reduced. Here, the rib itself is positioned as close as possible to the sealing surface of the flap in order to be able to almost completely close off the gap during the opening of the flap. For this reason, the rib is formed not on the flap main body but directly on the sealing lip, whereby it is in turn possible for the sealing lip as a whole, that is to say with sealing surface and vertical rib, to be produced as a unipartite plastics part. With the flap arrangement according to the invention, it is thus possible in a relatively simple but nevertheless highly effective manner for the generation of undesired whistling noises during the opening and closing of the flap to be prevented.

In an advantageous refinement of the flap arrangement according to the invention, a free edge of the rib has an irregular profile, in particular a sawtooth structure. By means of such a sawtooth structure, the generation of the undesired whistling noises at the gap, that is to say between the rib and the flap stop, can be reliably prevented. Here, the sawtooth structure gives rise to the generation of small turbulence, which prevents a directed air flow which generates the whistling sound.

In a further advantageous embodiment of the solution according to the invention, a vertical height of the rib is at least 3 mm. In this context, it has proven to be particularly advantageous for the free edge of the sealing surface or of the sealing rib to have a greater vertical height in relation to the flap main body than the free edge of the rib, because in this way, when the flap is fully open, an air flow flowing through the flap arrangement is not impeded. For example, the vertical height of the free edge in relation to the flap main body may be 6 mm, whereas—as mentioned in the introduction—the vertical height of the rib is 3 mm. 3 mm should however be selected in any case in order to be able to realize significant influencing, and thus a significant reduction, of the undesired whistling noises.

In a further advantageous embodiment of the solution according to the invention, the flap is produced together with sealing lip and rib in a 2-component injection moulding process. In this way, it is possible for the sealing lip together with the rib to be configured, for example, as a soft component and then connected cohesively to a relatively hard flap main body in an injection moulding process. With a 2-component injection moulding process of said type, it is possible for the entire flap of the flap arrangement to be produced not only with high quality but also inexpensively.

In a further advantageous embodiment of the solution according to the invention, the sealing surface runs obliquely with respect to the flap main body toward the front side thereof. The sealing lip thus has a sealing surface which is inclined with respect to the plane of the flap main body, for example a sealing surface which is inclined with respect to the flap main body by 30 to 40°, in particular by approximately 35°, wherein the rib itself protrudes substantially vertically with respect to the flap main body and thus at approximately 50 to 60° with respect to the sealing surface of the sealing lip. By means of a sealing surface which is inclined in this way, it is possible to realize particularly well-sealed, and thus particularly reliable, closure of the flap valve, that is to say of the flap on the flap stop, which is of great advantage for flawless functioning.

Further important features and advantages of the invention will emerge from the subclaims, from the drawings and from the associated description of the figures on the basis of the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein the same reference designations are used to denote identical or similar or functionally identical components.

BRIEF DESCRIPTION OF THE DRAWINGS

In the drawings, in each case schematically:

FIG. 1 is a sectional illustration through a flap arrangement according to the invention, FIG. 2 is a detail illustration in the region of a sealing lip from FIG. 1, FIG. 3 shows a view of a front side of a flap of the flap arrangement according to the invention.

DETAILED DESCRIPTION

Correspondingly to FIG. 1, a flap arrangement 1 according to the invention, in particular for a vehicle air conditioning system 2, has a housing 3 and has a flap 5 mounted in said housing so as to be pivotable about an axis 4. Here, the flap 5 serves for the regulation of an air flow in the housing 3 and has a flap main body 6 with a front side 7 which is arranged on the air inflow side in the operating state. According to the invention, an elastic sealing lip 8 with a sealing surface 9 is now provided on the flap main body 6, wherein, in the region of the sealing lip 8 and outside the sealing surface 9, there is arranged a rib 10 which projects substantially vertically from the front side 7 of the flap main body 6 and which serves for air flow rate reduction during the opening of the flap 5, wherein the sealing lip 8 and the rib 10 are formed in one piece.

Viewing the flap 5 in a detail illustration as per FIG. 3, it can be seen that a free edge of the rib 10 has an irregular profile, in this case a sawtooth structure 11. By means of this sawtooth-like structure 11 or, overall, an irregular profile, it is possible in particular to achieve that an undesired whistling noise arises only at a small opening angle of the flap 5.

Such a sawtooth structure 11 may also be arranged on a free edge of the sealing surface 9, as likewise emerges from FIG. 3.

Considering the detail illustration in FIG. 2, it can be seen that the sealing surface 9 runs obliquely with respect to the flap main body 6, that is to say with respect to a plane of the flap 5, toward the front side 7 thereof. Here, the sealing surface may be inclined with respect to the plane of the flap main body 6 by an angle α of approximately 30° to 40°, in particular by a of approximately 35°. By way of the inclined profile of the sealing surface 9, it is possible to achieve reliable and sealed contact against the flap stop 12.

Considering the sealing lip 8 and the rib 10 further, it can be seen in FIG. 3 that these both have a U-shaped profile, wherein the rib 10 has only short U-limbs in relation to the sealing lip 8.

In order that, when the flap 5 is fully open, a throughflow is not impeded as a result of the provision of the rib 10, the free edge of the sealing surface 9/sealing lip 8 has a greater vertical height $h_D$ in relation to the flap main body 6 (cf. FIG. 2) than the free edge of the rib 10. The vertical height $h_R$ of the free edge of the rib 10 is thus smaller than the vertical height $h_D$ of the sealing lip 8. The minimum height $h_R$ of the rib 10 should in this case be approximately 3 mm in order that it can have any influence whatsoever on the reduction of the whistling noises. It is however purely theoretically also conceivable for the rib 10 to be, for example, 6 mm tall, with the height $h_D$ of the sealing lip 11 preferably always being at least slightly larger in order that the rib 10 has no disruptive effect in terms of flow when the flap 5 is fully open. Here, "vertically" is meant in relation to the plane of the flap main body 6.

In order that the flap 5 and thus also the flap arrangement 1 can be produced both with high quality and inexpensively, it may be provided that the flap 5 is produced together with sealing lip 8 and rib 10 as a unipartite plastics injection-moulded part, wherein it is self-evidently alternatively also conceivable for the flap 5 to be produced together with sealing lip 8 and rib 10 in a 2-component injection moulding process, such that a different, in particular softer, material can be used for the sealing lip 8 and for the rib 10 than for the flap main body 6.

With the flap arrangement 1 according to the invention, and in particular the flap 5 designed in accordance with the invention, it is possible for a whistling noise that arises when the flap 5 is only slightly open to be considerably reduced, preferably even prevented, without the rib 10 that is provided for this purpose causing disruption in terms of acoustics or air flow rate when the flap 5 is fully open. Through the integration of the sealing lip 8 on the flap main body 6 of the flap 5, and thus the production of the entire flap 5 in one piece, it is also possible in particular for a hitherto required separate assembly step for the arrangement or installation of the sealing lip 10 to be omitted, which likewise has an advantageous effect on the production costs.

The invention claimed is:

1. A flap arrangement comprising:
   a housing,
   a flap arranged in the housing for regulating an air flow in the housing, the flap having a flap main body with a front side arranged on an air inflow side in an operating state,
   an elastic sealing lip with a sealing surface provided on the flap main body,
   a rib arranged in a region of the sealing lip and outside the sealing surface, the rib projecting substantially perpendicularly from the front side of the flap main body for reducing air flow rate during opening of the flap, wherein the sealing lip and the rib are formed in one piece, wherein a free edge of the rib has a non-linear profile, wherein the sealing surface runs obliquely with respect to the flap main body toward the front side thereof, wherein a portion of the sealing surface is configured to contact a seal stop in a sealed manner at a contact point that is not in a plane defined by the flap main body, wherein a free edge of the sealing surface has a greater distance from a plane defined by the front side of the flap main body than a free edge of the rib, whereby the rib does not impede an air flow when the flap is fully open, wherein the rib projects into the air inflow side when the portion of the sealing surface is in contact with the seal stop, and wherein the sealing surface forms an obtuse angle with the flap main body.

2. A flap arrangement according to claim 1, wherein a vertical height of the rib is at least 3 mm.

3. A flap arrangement according to claim 1, wherein the sealing surface is inclined with respect to the flap main body by 30° to 40°.

4. A flap arrangement according to claim 1, wherein a free edge of the sealing surface has a non-linear profile.

5. A flap arrangement according to claim 1, wherein at least one of the sealing lip and the rib has a U-shaped profile.

6. A flap arrangement according to claim 1, wherein the flap is produced together with the sealing lip and the rib in a 2-component injection moulding process.

7. A vehicle air conditioning system comprising:
a heat exchanger; and
at least one flap arrangement having:
a housing,
a flap arranged in the housing for regulating an air flow in the housing, the flap having a flap main body with a front side arranged on an air inflow side in an operating state,
an elastic sealing lip with a sealing surface provided on the flap main body,
a rib arranged in a region of the sealing lip and outside the sealing surface, the rib projecting substantially perpendicularly from the front side of the flap main body for reducing air flow rate during opening of the flap,
wherein the sealing lip and the rib are formed in one piece,
wherein a free edge of the rib has a non-linear profile,
wherein the sealing surface runs obliquely with respect to the flap main body toward the front side thereof,
wherein a portion of the sealing surface is configured to contact a seal stop in a sealed manner at a contact point that is not in a plane defined by the flap main body,
wherein a free edge of the sealing surface has a greater distance from a plane defined by the front side of the flap main body than a free edge of the rib, whereby the rib does not impede an air flow when the flap is fully open,
wherein the rib projects into the air inflow side when the portion of the sealing surface is in contact with the seal stop, and
wherein the sealing surface forms an obtuse angle with the flap main body.

8. A vehicle air conditioning system according to claim 7, wherein a free edge of the sealing surface has a non-linear profile.

9. A vehicle air conditioning system according to claim 7, wherein a vertical height of the rib is at least 3 mm.

10. A vehicle air conditioning system according to claim 7, wherein the sealing surface is inclined with respect to the flap main body by 30° to 40°.

11. A vehicle air conditioning system according to claim 7, wherein at least one of the sealing lip and the rib has a U-shaped profile.

12. A flap arrangement according to claim 1, wherein the non-linear profile is a sawtooth structure.

13. A flap arrangement according to claim 3, wherein the sealing surface is inclined with respect to the flap main body by 35°.

14. A flap arrangement according to claim 4, wherein the non-linear profile of the sealing surface is a sawtooth structure.

15. A flap arrangement comprising:
a housing,
a flap arranged in the housing for regulating an air flow in the housing, the flap having a flap main body with a front side arranged on an air inflow side in an operating state,
an elastic sealing lip provided on the flap main body, the sealing lip having a U-shaped profile and a sealing surface with a free edge that is a sawtooth structure,
a rib arranged in a region of the sealing lip and outside the sealing surface, the rib projecting substantially perpendicularly from the front side of the flap main body for reducing air flow rate during opening of the flap, the rib having a U-shaped profile and a free edge that is a sawtooth structure,
wherein the sealing lip and the rib are formed in one piece,
wherein the sealing surface runs obliquely with respect to the flap main body toward the front side thereof,
wherein a portion of the sealing surface is configured to contact a seal stop in a sealed manner at a contact point that is not in a plane defined by the flap main body,
wherein a free edge of the sealing surface has a greater distance from a plane defined by the front side of the flap main body than a free edge of the rib, whereby the rib does not impede an air flow when the flap is fully open,
wherein the rib projects into the air inflow side when the portion of the sealing surface is in contact with the seal stop, and
wherein the sealing surface forms an obtuse angle with the flap main body, the obtuse angle ranging from 140 degrees to 150 degrees.

16. A flap arrangement according to claim 1, wherein the flap main body has a non-linear profile along an entire peripheral edge thereof, including a free edge of the sealing surface.

17. A flap arrangement according to claim 16, wherein the non-linear profile of the flap main body is a sawtooth structure.

* * * * *